Sept. 25, 1945.  LE ROY F. MAURER  2,385,635
ANTISHIMMY DEVICE
Filed April 28, 1943

INVENTOR
LeRoy F. Maurer
BY
Bean, Brooks, Buckley & Bean
ATTORNEYS

Patented Sept. 25, 1945

2,385,635

UNITED STATES PATENT OFFICE 2,385,635

ANTISHIMMY DEVICE

Le Roy F. Maurer, Buffalo, N. Y., assignor to Bell Aircraft Corporation, Buffalo, N. Y.

Application April 28, 1943, Serial No. 484,822

4 Claims. (Cl. 188—93)

This invention relates to aircraft landing gear, and more particularly to improvements in antishimmy control means for castering or swivelling landing gear elements.

It is current practice to arrange that the nose wheel of a tricycle type landing gear, or the tail wheel of a conventional landing gear be adapted to caster or swivel about substantially vertical axes to facilitate steering of the aircraft when taxiing. Such wheel turning motions must, however, be checked or damped to prevent undesirable shimmying or wobbling of the associated landing wheel, such as might otherwise seriously interfere with effective steering and safe handling of the aircraft. Generally satisfactory devices for the purpose of checking or damping the referred to tendencies to shimmy are disclosed in U. S. Patents 2,284,148 and 2,275,371. However, the devices of the prior art, including those of the patents referred to, have proved to be seriously defective whenever it is required to employ relatively low viscosity or "thin" fluids in the hydraulic damping systems, such as in connection with operation of aircraft at extremely low temperature regions. Experience has proven that the prior art devices referred to are incapable under such conditions of providing the antishimmy control which is required for safe operation of the aircraft; and it is a primary object of the present invention to provide improvements in devices of the character referred to whereby the disadvantages and difficulties aforesaid will be eliminated. Other objects and advantages of the invention will appear in the specification hereinafter.

Figure 1:
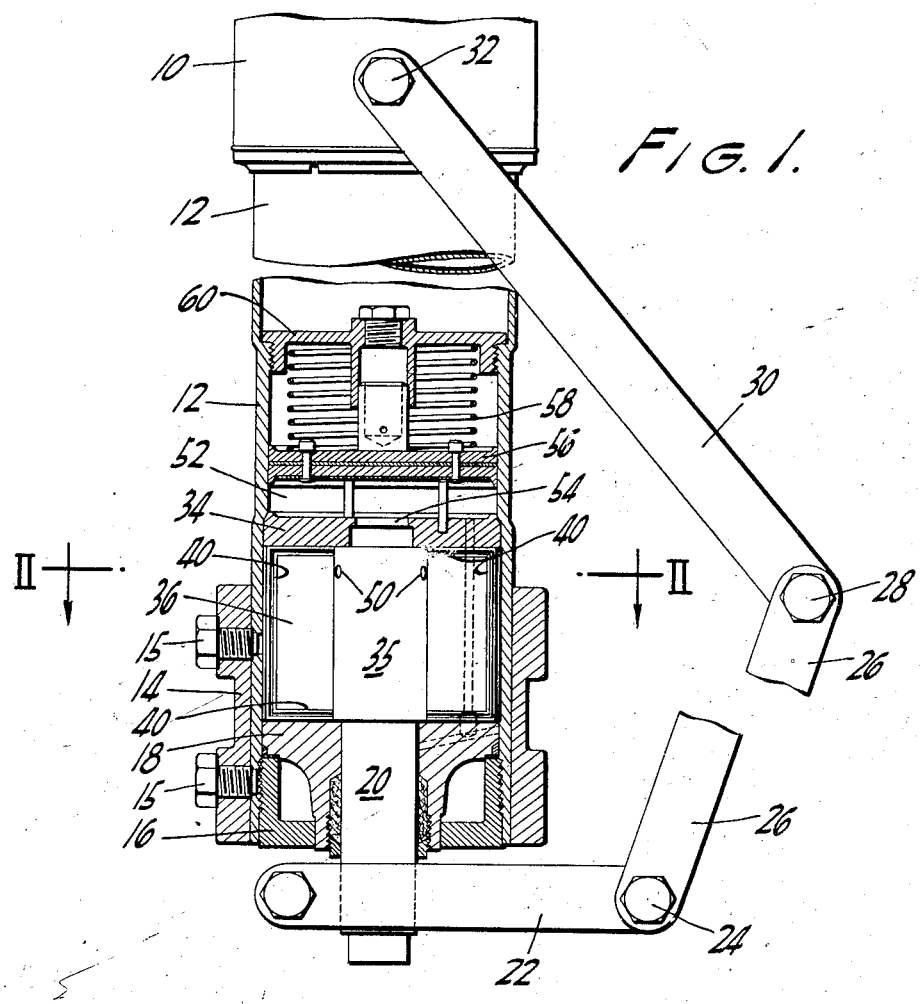
Fig. 1 is a fragmentary view, partly in side elevation and partly in section, of a portion of a shock absorbing type landing strut embodying the invention.
Figure 2:
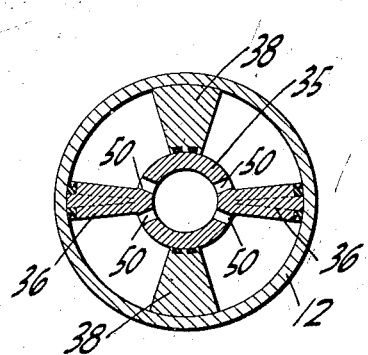
Fig. 2 is a section taken substantially along line II—II of Fig. 1.

The invention is illustrated in the drawing as being embodied in an aircraft landing strut of the shock absorbing type which may include any suitable form of shock absorbing mechanism (not shown). Such strut will usually comprise a pair of telescopic tubular members such as at 10—12 of Fig. 1, which members are arranged to telescopically retract under the shock of a landing, and to incorporate any suitable spring or hydraulic or combination shock absorbing mechanism to control the retraction-extension operation thereof.

Thus, it will be understood that the tubular member 10 will be arranged to be mounted at its upper end upon the aircraft fuselage so as to dispose the landing strut generally in a vertical attitude; while provision will be made to rigidly connect the associated landing wheel or axle carrying bracket to the lower end of the tubular member 12. For this purpose the drawing illustrates the hub portion 14 of a landing wheel fork as being mounted to encircle the lower end of the tubular member 12 and to be locked thereon by screws 15. Thus, it will be understood that the tubular member 12 is assembled to be integral with the landing wheel fork and to be reciprocable longitudinally within the tubular member 10 for shock absorbing purposes and to be rotatable axially thereof for swivelling relative to the fixed tube 10 in connection with alterations of the aircraft taxiing direction.

The tubular member 12 is fitted at its lower end with a gland 16 which supports interiorly of the unit a bottom closure plate 18. The plate 18 is centrally bored to receive in rotatable and fluid-sealed relation a control shaft 20 to extend from exteriorly of the unit into the interior thereof. A link 22 is clamped upon the lower extending end of the shaft 20 to extend radially thereof into pivotal connection at 24 with a scissors-link 26 pivoted at 28 to a second scissors-link 30 which connects at 32 to the tubular member 10. Thus, the scissors-link unit 26—30 fixes the control shaft 20 against rotation axially of the tubular member 10 without interfering with shock absorbing telescopic movements of the shaft and tube unit.

Interiorly of the tubular member 12 a top plate 34 is disposed transversely thereof in spaced relation with respect to the bottom plate 18 and is centrally bored to provide a fluid passageway therethrough. Thus, the spaced plate members 18—34 provide a fluid chamber interiorly of the tubular member 12. Intermediately of the end plates 18—34 the control shaft 20 is enlarged as at 35 to provide a hollow hub-like portion which seals against the top and bottom plates and from which radiate in diametrically opposed relation a pair of vanes 36—36; the vanes 36—36 being integral with the hub portion 35 of the shaft. The vanes 36—36 extend radially into slide-fitting relation at their outer end wall portions with the inner wall of the tubular member 12, and are fixed against rotation axially of the landing strut by reason of the connections between the shaft 20 and the scissors-linkage 26—30 and the upper tube 10.

The tube 12 is formed with a pair of diametrically opposed vanes 38—38 which extend radially inwardly therefrom and into slide bearing contact at their inner end face portions with the hub 35 of the control shaft 20. The elements of the mechanism are so proportioned and arranged in connection with the aircraft fuselage and the landing wheel that whenever the landing wheel is directed longitudinally of the airplane the vanes 38—38 substantially bisect the spaces within the fluid chamber defined by the vanes 36—36.

Figures 3, 4:
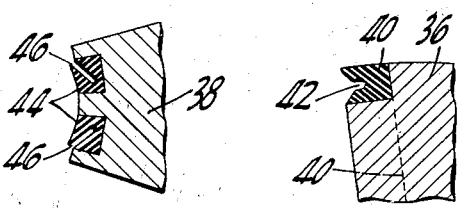
Figs. 3 and 4 are fragmentary enlargements of details of Fig. 2.

The vanes 36—36 are provided with special sealing devices which comprise, as illustrated in Figs. 1 and 4, strips of flexible sealing material indicated generally at 40. These seals may be formed of fluid-resistant rubber or synthetic material or thin metal or the like, and vulcanized or cemented or otherwise suitably fixed within correspondingly recessed portions of the vane members, whereby the sealing strips 40—40 are extended to comprise the casing-contacting edge portions of the vanes along the top and side and bottom sections thereof and at both faces thereof. Thus, the sealing strips 40—40 are adapted to resiliently bear against the inner wall of the tubular member 12 at the portion thereof defining the fluid chamber; and to effectively seal the vanes 36—36 relative to the casing 12 and relative to the bottom and top plates 18—34. The seal strips 40—40 are preferably grooved as indicated at 42 whereby fluid pressure forces acting thereon from opposite sides of the vanes will tend to press the outer sections of the sealing strips into improved pressure sealing relation against the wall of the casing 12.

To more effectively seal the vanes 38—38 relative to the hub 35 of the control shaft, the vanes 38—38 are vertically grooved as illustrated in Fig. 3 to receive in inlaid relation therein sealing strip devices 44—44. The sealing strips 44—44 may be of material similar to that of the sealing devices 40—40 and similarly mounted upon the vanes. Preferably, the strips 44—44 will be longitudinally grooved as indicated at 46 obliquely and opposed to the direction of entrance of fluid thereto, to enable fluid pressure forces acting therein to expand the sealing strips into perfect sealing relation against the hub 35.

The hub 35 is perforated as indicated at 50 so as to provide fluid passageways of predetermined reduced size extending in open communication between the fluid chamber portions at opposite sides of the vanes 38—38. Thus, it will be understood that whenever the aircraft is moving upon a landing surface and is steered so as to turn the wheel of the landing strut away from its normal straight forward direction, the forces tending to turn the landing wheel relative to the fuselage will cause the lower tube 12 to rotate axially of the tube 10, thus forcing the vanes 38—38 to rotate about the hub of the control shaft in such manner as to enlarge the chamber space at one side of each of the vanes while correspondingly reducing the space at the other side thereof. With the control chamber filled with fluid this motion of the vanes relative to the control shaft 20 will be permitted because of the passage of fluid through the ports 50—50. However, because these passageways are of reduced dimensions, the passage of fluid therethrough will be retarded in predetermined controlled manner, whereby the swivelling response of the landing wheel to the forces externally thereof will at all times lag. Therefore, directional turning oscillations of the landing wheel will be at all times damped; and undesirable shimmying or wobbling thereof will be prevented.

The control unit of the invention will preferably incorporate a fluid loss compensating reservoir such as a supplemental fluid chamber 52 arranged in open communication at 54 with the interior of the hub 35. A piston 56 backed by a spring 58 is carried by a transverse plate 60 to maintain the auxiliary supply of fluid in the chamber 52 under constant pressure and in communication with the interior of the shimmy control chamber of the mechanism.

Thus, it will be understood that the invention provides a particularly simple and rugged mechanism for controlling directional turning movements of a landing wheel carried by the undercarriage of an aircraft or the like; and that the turn control action referred to is effected thereby without interference with the shock absorbing telescopic operation of the landing strut. Also, it will be appreciated that because of the particular arrangement and formation of the sealing strips 40—44, they may be relatively delicate of structure for most effectively sealing the relatively moving parts of the damping device, and are so formed and disposed and carried by the vane elements of the mechanism as to be protected in improved manner. Consequently, the shimmy control mechanism of the invention is adapted to operate in improved manner while employing fluids of unusually "thin" body, such as is required for satisfactory performance under extremely low temperature conditions. The use of such light fluids in prior art devices, including the disclosures of the patents referred to, is unsatisfactory because of the inability of such devices to adequately "hold" the thin fluids referred to. Thus, the mechanism of the invention constitutes an improved anti-shimmy means which is adapted to function with optimum effectiveness both at high and low temperatures, whereby increased safety of aircraft operation is provided.

It will be understood that although the invention has been illustrated in conjunction with only one form of undercarriage arrangement, it is not limited to such arrangement but may be incorporated with equal facility in any other type gear; and that although only one form of the mechanism of the invention has been shown and described in detail, it will be apparent that various changes may be made therein without departing from the spirit of the invention or the scope of the appended claims.

I claim:

1. In a swivel control mechanism for a directionally turnable aircraft landing gear member including a fluid carrying casing adapted to be connected to one portion of a pair of relatively turning elements of said landing gear member and a control piston adapted to be connected to the other portion of said turning elements to reciprocate relative to said casing upon reciprocative relative turnings of said elements, fluid sealing means carried by said piston comprising a pair of strip members formed of resilient material carried in parallel spaced grooved portions of said piston extending transversely of the direction of piston movement to extend therefrom into fluid sealing slide bearing relation against said casing, said strip members being slotted inwardly from opposite sides thereof and diagonally in opposite directions from their casing contact surfaces.

2. A wheel anti-shimmy device comprising a pair of cooperating wheel support members, one of said support members being adapted to be fixed to a vehicle and the other of said support members being adapted to carry a land contacting wheel, said support members being relatively rotatable to permit directional turning movements of the carried wheel relative to said body, a fluid carrying casing connected to one of said support members, a piston connected to the other of said support members to move relative to said casing within the fluid carrying space thereof upon turning of said wheel carrying support relative to said body, said piston subdividing the space within said casing and having fluid passageways therethrough of restricted dimensions for retarding flow of fluid therethrough in response to movements of said pistons relative to said casing, and fluid sealing means carried by said casing-piston elements to relatively seal the latter, said sealing means comprising paired strips of resilient material carried within parallel grooved face portions of said casing-piston elements, and said strips being each recessed so that the recesses of paired strips are inclined inwardly from the fluid-sealing face portions thereof in opposite directions.

3. In a turn control mechanism for a directionally turnable vehicle wheel support including a fluid carrying casing adapted to be connected to one portion of a pair of relatively turning elements of said wheel support, a control piston adapted to be connected to the other portion of said support to move relative to said casing upon relative turning of said elements, fluid sealing means carried by said casing-piston elements to relatively seal the latter, said sealing means comprising paired strips of resilient material carried within parallel grooved face portions of said casing-piston elements, and said strips being each recessed so that the recesses of paired strips are inclined inwardly from the fluid-sealing face portions thereof in opposite directions.

4. A piston for reciprocal operation against fluids under differential pressures at opposite sides of said piston, comprising a vane type body member adapted to be reciprocated within a fluid holding casing, said body member being parallel recessed at the casing-contiguous edge portions thereof and having flexible sealing strip members mounted within the recessed portions thereof to move with said piston, said sealing members being recessed in such manner as to present grooves extending inwardly in opposite direction from the casing contact surfaces of paired strips.

LE ROY F. MAURER.